Feb. 9, 1932.  W. SCHAAKE  1,844,689
CURRENT COLLECTOR
Filed March 27, 1931

WITNESSES.
E. A. McCloskey
W. G. Chilcott

INVENTOR
William Schaake.
BY
Wesley G. Barr
ATTORNEY

Patented Feb. 9, 1932

1,844,689

UNITED STATES PATENT OFFICE

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA

CURRENT COLLECTOR

Application filed March 27, 1931. Serial No. 525,697.

My invention relates generally to current collectors and more particularly to current collectors of the sliding-shoe type for overhead trolley systems.

An object of my invention, generally stated, is to provide a current collector which shall be simple and efficient in operation and which may be readily and economically manufactured.

A more specific object of my invention is to prevent the forward end of a trolley shoe from being raised upwardly by the frictional drag of a trolley conductor, thereby obtaining a uniform wearing of the contact surface of the trolley shoe.

Another object of my invention is to provide a trolley shoe which shall be permitted to maintain a horizontal position for the various positions assumed by a trolley pole during the operation of a vehicle.

Other objects of my invention will be described fully hereinafter or will be apparent to those skilled in the art.

For a fuller understanding of the nature and scope of my invention, reference may be had to the following detailed description, taken in conjunction with the accompanying drawings, in which.

Figure 1:
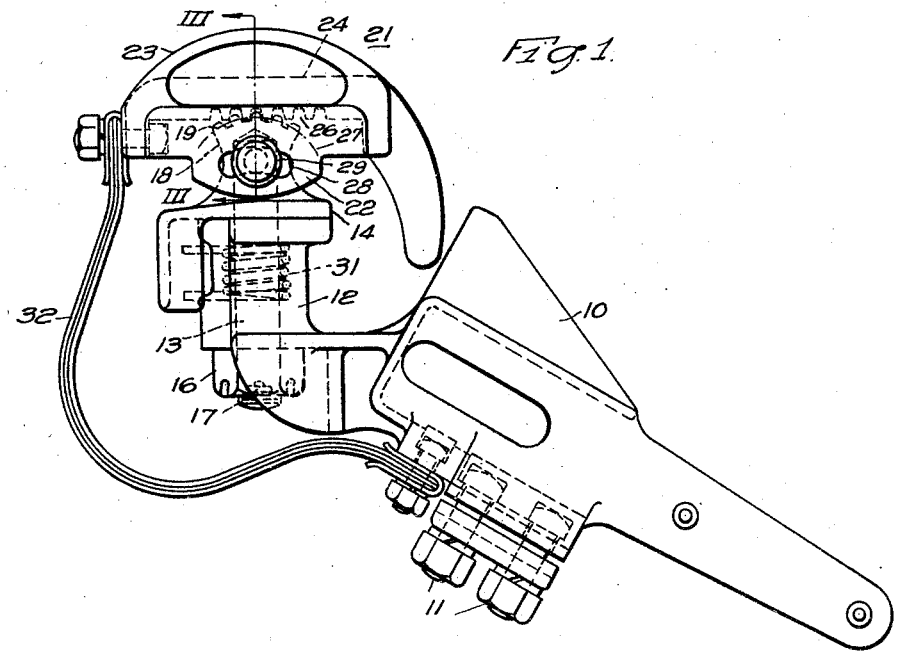
Figure 1 is a view, in side elevation, of a current collector constructed in accordance with my invention.

Referring to the drawings, a support member 10 is disposed to be clamped upon a trolley pole (not shown) by means of two bolts 11. A bearing sleeve 12 is formed integrally on the upper end of the support 10 and disposed at an angle to the support. The bearing sleeve 12 is adapted to receive a bearing pin 13.

As shown, a swivel member 14 is rotatably mounted upon the bearing sleeve 12 by means of the bearing pin 13, the upper end of which may be cast in the swivel member 14. The lower end of the bearing pin is threaded to receive a castellated nut 16 to retain the bearing pin within the sleeve 12. A cotter key 17 may be inserted through the pin 13 to retain the nut 16 on the pin.

The upper part of the swivel member 14 is so shaped as to form a gear segment 18, having gear teeth 19. In the preferred embodiment of my invention, the swivel member 14 and the gear segment 18 are cast integrally in one piece. If desired, the gear segment may be made as a separate piece and mounted upon the swivel member in any suitable manner.

Figure 3:
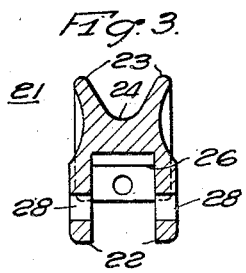
Fig. 3 is a sectional view of the trolley shoe, taken along the line III—III of Fig. 1.

A current-collecting member or trolley shoe 21 is mounted upon the swivel member 14 in a manner to oscillate relative thereto. As shown in Fig. 3, the trolley shoe 21 is provided with two downwardly projecting and spaced lugs 22 which fit over the gear segment 18. The upper part of the trolley shoe is so shaped as to form a trough having sides 23 and an elongated contact surface 24 for engaging a trolley conductor (not shown).

In order to raise the center of oscillation of the trolley shoe to a point as close to the contact surface of the shoe as possible, gear teeth 26 are provided on the bottom of the shoe which engage the teeth 19 of the gear segment 18 to support the shoe on the swivel member 14. The trolley shoe, therefore, pivots on the gear teeth, the center of oscillation being located on the pitch circle of the gear teeth 19, designated by the broken line 27. The shoe 21 oscillates about a point on the pitch circle 27, as the trolley pole is raised or lowered, because of the varying height of the trolley conductor.

It will be understood that the moment arm of the frictional drag of the trolley conductor on the trolley shoe is decreased by raising the center of oscillation to a point which is close to the line of contact between the trolley conductor and the trolley shoe. By decreasing the moment arm of the frictional drag, the turning moment tending to rotate the trolley shoe about the axis of oscillation is decreased. Therefore, the forward end of the trolley shoe is not raised upwardly as the shoe follows the trolley conductor and contact is maintained between the conductor and the shoe over the entire length of the contact surface of the shoe. In this manner, a uniform wearing of the contact surface of the trolley shoe is obtained.

In order to retain the shoe 21 in operative relation to the swivel member 14, an arcuate slot 28 is provided in each of the lugs 22. A bolt 29 is inserted through the slots 28 and the swivel 14 to retain the shoe in position.

Figure 2:
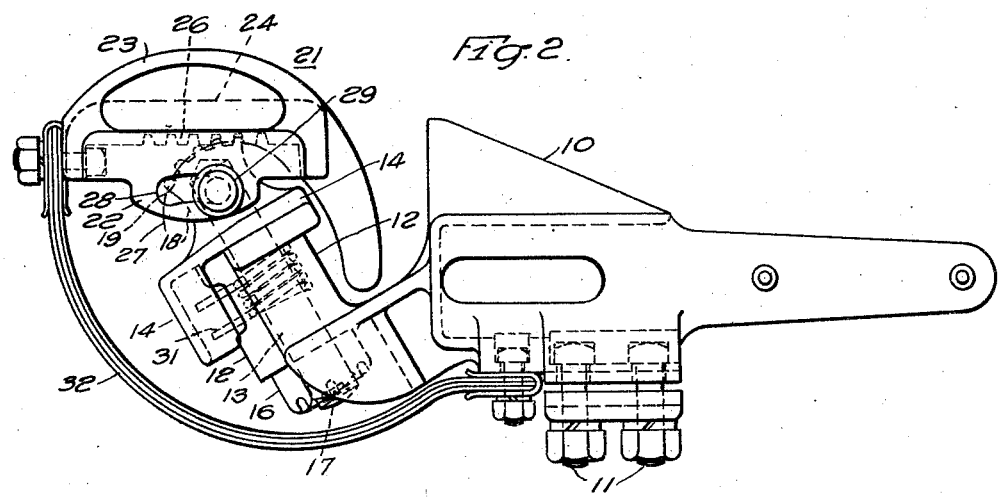
Fig. 2 is a similar view of the current collector illustrated in Fig. 1, showing the position of the trolley shoe relative to a trolley pole when the pole is in a horizontal position.

As shown, the slots 28 are so shaped that the shoe is permitted to be maintained in a horizontal position for the different positions which may be assumed by the trolley pole during the operation of the vehicle. The relative positions of the trolley shoe 21 and the support 10, when the trolley pole is horizontal, are shown in Fig. 2. It will be seen that the arcuate slots and the gear teeth are so disposed as to permit the trolley shoe to maintain a horizontal position when the trolley pole is in its lowermost position, as well as when it is raised to an angular position. In this manner, the entire contact surface of the trolley shoe is maintained in engagement with the trolley conductor as the height of the conductor varies because of different operating conditions.

As previously described, the swivel 14, which supports the shoe 21, is rotatably mounted on the bearing sleeve 12 to permit the trolley shoe to follow the trolley conductor when the vehicle is going around a curve. In order, however, that the trolley shoe shall normally be maintained in alinement with the trolley pole, a double-acting spring 31 is disposed on the bearing pin 13. As shown, the ends of the helical spring 31 engage the swivel member 14 to resiliently bias the trolley shoe to alinement with the trolley pole. The trolley shoe is thereby held in proper contact with the trolley conductor and permitted to follow the conductor when rounding a curve.

A flexible shunt 32 is provided for conducting current from the shoe 21 to the support 10 which is mounted on a trolley pole. By permitting the current to flow through the shunt 32, instead of through the bearing members, arcing between the bearing members and the consequent pitting of the members are prevented.

Trolley shoes constructed and mounted as hereinbefore described have given very satisfactory service and had a long life. Current collectors of this type are especially suited for use on mining locomotives, which are required to operate under unfavorable conditions. By preventing the forward end of the trolley shoe from tilting upwardly, because of the frictional drag of the trolley conductor, the entire contact surface of the shoe engages the conductor, and uniform wearing of the shoe is ensured.

Since numerous changes may be made in the above-described construction, and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a current collector, in combination, a support, a swivel member rotatably mounted upon the support, a gear segment disposed on the swivel member, a trolley shoe mounted upon the swivel member to oscillate relative thereto, gear teeth on the trolley shoe disposed to engage the gear segment on the swivel member, the center of oscillation of the trolley shoe coinciding with the pitch circle of the teeth of the gear segment.

2. In a current collector, in combination, a support, a swivel member rotatably mounted upon the support, a gear segment formed integrally on the swivel member, a trolley shoe mounted upon the swivel member to oscillate relative thereto, gear teeth formed integrally on the trolley shoe and disposed to engage the gear segment on the swivel member, the center of oscillation of the trolley shoe being on the pitch circle of the teeth of the gear segment.

3. In a current collector, in combination, a support, a swivel member rotatably mounted upon the support, a gear segment formed integrally on the swivel member, a trolley shoe mounted upon the swivel member to oscillate relative thereto, and having an arcuate slot, gear teeth formed integrally on the trolley shoe and disposed to engage the gear segment on the swivel member, the center of oscillation of the trolley shoe being on the pitch circle of the teeth of the gear segment, and means passing through the arcuate slot in the shoe and engaging the swivel member to retain the shoe and the swivel member in operative relation.

4. In a current collector, in combination, a support, a swivel member rotatably mounted upon the support, a gear segment formed integrally on the swivel member, a bearing pin to retain the swivel member and the support in rotative relation, a double-acting spring disposed on the bearing pin and engaging the swivel member to resiliently bias it to a predetermined position relative to the support, a trolley shoe mounted upon the swivel member to oscillate relative thereto, gear teeth formed integrally on the trolley shoe and disposed to engage the gear segment on the swivel member, the center of oscillation of the trolley shoe being on the pitch circle of the teeth of the gear segment.

5. In a current collector, in combination, a support, a swivel member rotatably mounted upon the support, a gear segment formed integrally on the swivel member, a bearing pin to retain the swivel member and the support in rotative relation, a double-acting spring disposed on the bearing pin and engaging the swivel member to resiliently bias it to a predetermined position relative to the support, a trolley shoe mounted upon the swivel member to oscillate relative thereto, gear teeth formed integrally on the trolley shoe and disposed to engage the gear segment on the swivel member, the center of oscillation of the trolley shoe being on the pitch circle of the teeth of the gear segment, and means for retaining the shoe and the swivel member in operative relation.

6. In a current collector, in combination, a support, a swivel member rotatably mounted upon the support, a gear segment formed integrally on the swivel member, a bearing pin to retain the swivel member and the support in rotative relation, a double-acting spring disposed on the bearing pin and engaging the swivel member to resiliently bias it to a predetermined position relative to the support, a trolley shoe mounted upon the swivel member to oscillate relative thereto, gear teeth formed integrally on the trolley shoe and disposed to engage the gear segment on the swivel member, and a flexible conductor to conduct current from the trolley shoe to the support.

7. In a current collector, in combination, a support, a swivel member rotatably mounted upon the support, a gear segment formed integrally on the swivel member, a trolley shoe mounted upon the swivel member to oscillate relative thereto, spaced lugs on the trolley shoe disposed to fit over the gear segment, gear teeth formed integrally on the trolley shoe and disposed to engage the gear segment on the swivel member, the spaced lugs being provided with arcuate slots disposed to permit the trolley shoe to be retained in a horizontal position, and means passing through the arcuate slots and engaging the swivel member to retain the shoe and the swivel member in operative relation.

8. In a current collector for engaging a trolley conductor, in combination, a support, a swivel member rotatably mounted upon the support, a gear segment disposed on the swivel member, a trolley shoe mounted upon the swivel member to oscillate relative thereto and having an elongated contact surface to engage the trolley conductor, gear teeth on the trolley shoe disposed to engage the gear segment on the swivel member, the trolley shoe being provided with an arcuate slot disposed to cooperate with the gear teeth to maintain the elongated contact surface of the trolley shoe in engagement with the trolley conductor, and means passing through the arcuate slot and engaging the swivel member to retain the shoe and the swivel member in operative relation.

In testimony whereof, I have hereunto subscribed my name this 23rd day of March, 1931.

WILLIAM SCHAAKE.